United States Patent [19]
Lawless et al.

[11] Patent Number: 5,222,713
[45] Date of Patent: Jun. 29, 1993

[54] SOLID STATE REGULATOR FOR NATURAL GAS

[75] Inventors: William N. Lawless, Westerville; Robert W. Arenz, Columbus, both of Ohio

[73] Assignee: CeramPhysics, Westerville, Ohio

[21] Appl. No.: 823,139

[22] Filed: Jan. 21, 1992

[51] Int. Cl.$^5$ .............................................. F16K 31/02
[52] U.S. Cl. .................................. 251/129.06; 138/45; 138/46; 251/4; 239/533.14
[58] Field of Search ............... 138/45, 46; 239/533.14; 417/322; 251/129.06, 4

[56] References Cited

U.S. PATENT DOCUMENTS

| | | | |
|---|---|---|---|
| 3,072,151 | 1/1963 | Quercia | 251/4 X |
| 4,158,368 | 6/1979 | Clark | 251/129.06 X |
| 4,515,534 | 5/1985 | Lawless et al. | |
| 4,609,014 | 9/1986 | Jurjevic et al. | |
| 4,991,616 | 2/1991 | Fabregat | 137/93 |
| 5,092,360 | 3/1992 | Watanabe et al. | 251/129.06 X |
| 5,938,742 | 7/1992 | Smits | |

Primary Examiner—Arnold Rosenthal
Attorney, Agent, or Firm—Killworth, Gottman, Hagan & Schaeff

[57] ABSTRACT

A solid state apparatus for regulating the flow of fluids in general, and natural gas, in particular, is provided. The solid state apparatus includes an actuator made of electrostrictive, magnetostrictive or piezoelectric material. The actuator displaces upon application of an electric field to vary the compression on an elastomer having an orifice, thereby varying the amount of elastomeric material extruded into the orifice. Fluid flow through the regulator is thereby controlled. A system for regulating the flow of gas integrates the regulator with a sensor to detect a gas characteristic, such as gas partial pressure, and send control signals to control the operation of the regulator. The solid-state gas regulator is capable of low cost production and operation and suitable for electronic feedback control.

49 Claims, 10 Drawing Sheets

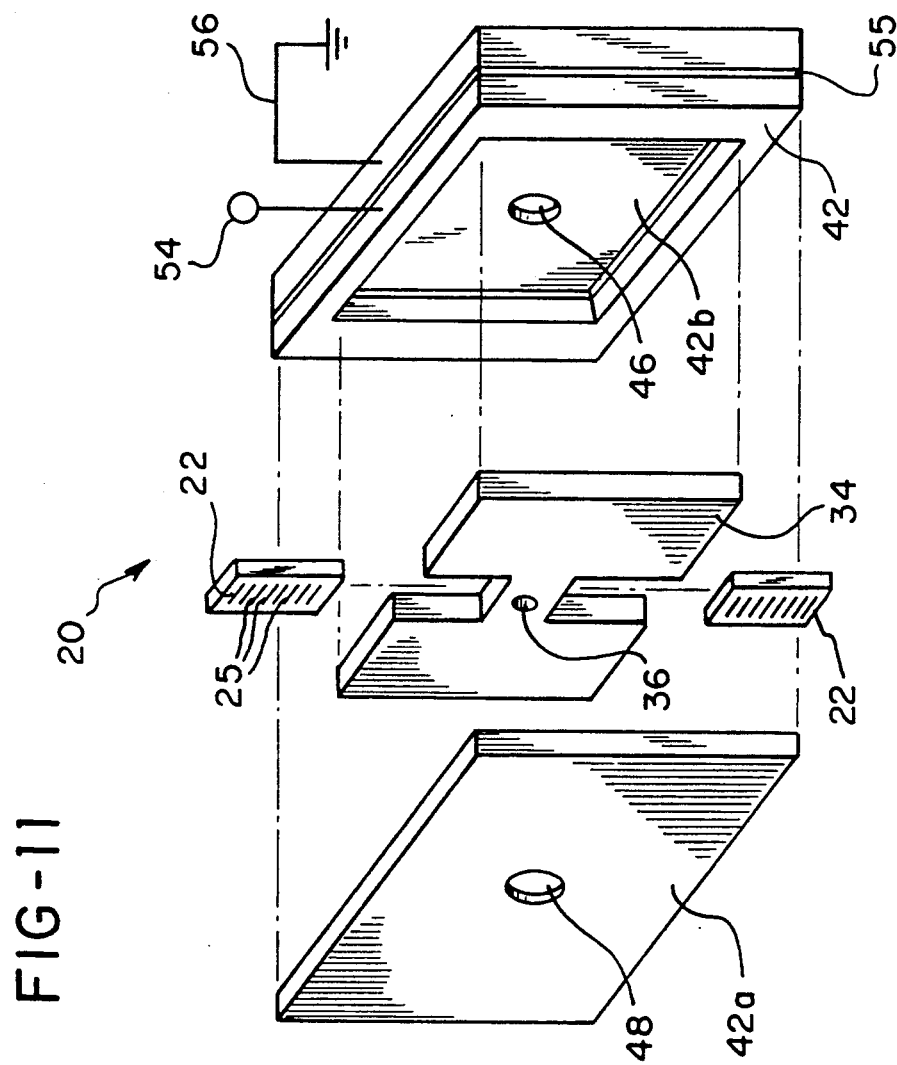

SOLID STATE REGULATOR FOR NATURAL GAS

BACKGROUND OF THE INVENTION

The present invention relates to an apparatus for regulating the flow of fluids, and, more particularly, to a solid state natural gas regulator capable of low cost production and operation and suitable for electronic feedback control.

Gas-fired appliances and systems in residential, commercial, and industrial applications are equipped with mechanical regulators which are well-known and have remained essentially unchanged for many years. Mechanical regulators typically include diaphragms which step-down the pressure in a gas feed line to a pressure acceptable for use. A significant disadvantage of these regulators is that they cannot be easily or inexpensively interfaced with electronic feedback control. In the regulation of natural gas, for example, this disadvantage becomes an increasingly serious obstacle to efficiency, even as more sophisticated sensors are developed for monitoring combustion efficiency. A need for monitoring combustion efficiency may arise, for example, where the mixing of natural gas from different suppliers results in a gas supply of variable heating content, or where feed line pressure varies greatly.

Numerous commercial and industrial processes involving other gases also use electronic sensors and control elements which seek to determine and control gas partial pressures. Regulators amenable to electronic feedback control are sought both to optimize operational efficiency as well as to produce higher quality products by more effective control of gases used in those processes.

Accordingly, the need exists for inexpensive, solid-state regulators which may be readily interfaced electronically with control and monitoring systems. The regulator should be capable of low cost production, and have relatively modest electric power requirements. Moreover, the regulator should be applicable to a wide variety of gases and liquids to satisfy the need for solid state regulators in a variety of residential, commercial and industrial applications.

SUMMARY OF THE INVENTION

The present invention provides a solid-state gas regulator deriving its regulating action from the relatively large dimensional changes that occur in certain magnetostrictive, electrostrictive, and piezoelectric ceramic materials. Magnetostrictive materials change dimension when a magnetic field is applied. Electrostrictive and piezoelectric materials change dimension when an electric field is applied. Such materials are used as actuators for the regulator of the present invention, and the dimensional changes are used to compress an elastomer having an orifice. The elastomer in the design acts as a motion-amplifying medium such that the actuator displacement is magnified in causing the resulting change in the orifice diameter. Change in the orifice diameter occurs as the elastomer extrudes into the orifice.

While the present invention will be described in terms of electrostrictive ceramic materials, it will be understood that reference to electrostrictive materials in this specification will include high strain capability ceramic materials, electrostrictive, piezoelectric, and magnetostrictive materials.

The apparatus includes at least one actuator made of one or more blocks of such material, an elastomer, and means for distributing pressure disposed therebetween. The apparatus further includes a means for selectively applying an electric field to the actuator. The actuator and elastomer are constrained such that application of the electric field to the actuator causes its displacement against the means for distributing pressure, and displacement of the means for distributing pressure against the elastomer. The means for distributing pressure serves to spread the force of the displacement of the actuator(s) evenly across a surface of the elastomer. This displacement compresses the elastomer, causing it to extrude into the orifice to vary the orifice size. In some actuator configurations the actuator may directly compress the elastomer, and the means for distributing pressure may be eliminated.

Alternatively, the apparatus may include an actuator initially disposed in compression with the elastomer, so as to initially close or constrict the orifice. So compressed, the elastomer extrudes to, at least partially, fill the orifice. The actuator and elastomer are constrained such that application of the electric field causes displacement of the actuator to relax the elastomer.

The preferred electrostrictive ceramic material is lead-magnesium-niobate-titanate (PMNT). Other useful electrostrictive materials may be expressed as $PbMO_3$, where M is a member selected from the group consisting of $(Mg_{\frac{1}{3}}Nb_{\frac{2}{3}})$, and $(Sc_{\frac{1}{2}}Ta_{\frac{1}{2}})$, or appropriate combinations thereof. $BaTiO_3$ and/or $SrTiO_3$ with doping are also electrostrictive materials which may be used in the present invention. Alternatively, the material may be a piezoelectric ceramic material. Suitable piezoelectric materials include so-called donor-doped soft piezoelectric ceramics from the lead-zirconate and lead-titanate families. The soft piezoelectric materials have low coercivity and high $d_{33}$ coefficients. Examples are PZT-5A and PZT-5H piezoelectric ceramics available from Vernitron Corp. In short, piezoelectric materials in the lead-zirconate-titanate system are preferred.

Suitable magnetostrictive materials include rare earth magnetostrictive alloys, such as alloys of terbium, dysprosium, and iron. In particular, $TbTe_2$, $Tb_xDy_{1-x}Fe_2$, $Tb_xDy_{1-x}Fe_{1.9-1.98}$ (Terfenol-D ®), and combinations thereof are suitable. Terfenol-D ® is preferred.

The elastomer of the present invention may be made of suitable elastomeric materials. Elastomeric materials are well known in the art and examples here are silicone rubbers (polysiloxanes) and butadiene. Composite elastomeric materials may also be appropriate for the present invention, and an example here would be a "bladder" arrangement consisting of a latex sheath filled with an appropriate liquid, such as silicone oil.

Additionally, the means for applying the electric field may include a plurality of metallic plate electrodes disposed in a substantially parallel, spaced relationship within the piezoelectric, or electrostrictive ceramic material. Means for applying a magnetic field may include a coil disposed around the magnetostrictive material. The apparatus of the present invention may thereby be operated as a regulating valve for selectively controlling the quantity of gas allowed therethrough.

The regulator of the present invention may also be integrated into a control system with a sensor monitoring a gas partial pressure, or the operation of a process or device. In a systems application the electric field may be applied in response to sensor or control signals to control the flow of gas through the regulator. For example, an oxygen sensor in the flue of a natural gas-fired appliance may be used to measure oxygen concentration in the flue to maintain a predetermined combustion efficiency. The oxygen sensor signal may be input to a microprocessor which, in response, varies the voltage applied to the actuator of a regulator to maintain a preprogrammed oxygen level in the flue. The microprocessor may also be used to adjust the regulator to optimize the combustion efficiency of the appliance in accordance with a programmed routine, or in response to other or additional variables.

Accordingly, it is an object of the present invention to provide an apparatus for regulating gas having an actuator(s) of magnetostrictive, piezoelectric, electrostrictive ceramic material, an elastomer having an orifice, means for distributing pressure, a means for applying a strain-inducing electric or magnetic field to the actuator, and a means for constraining the actuator and the elastomer, whereby the actuator displaces and extrudes the elastomer so as to adjust the orifice, including closing thereof; to provide an apparatus that is solid-state and suitable for electronic control; and provide alternative embodiments which may be normally closed and normally open; and to provide a gas regulating system comprised of a regulating valve, as described, a sensor, and appropriate interfacing electronics, where the valve adjusts in response to the sensor which, for example, monitors a gas partial pressure Other objects and advantages of the invention will be apparent from the following detailed description, the accompanying drawings and the appended claims.

BRIEF DESCRIPTION OF THE DRAWINGS

FIG. 11 is an exploded view of an alternative configuration of the fourth embodiment of the present invention.

DETAILED DESCRIPTION OF THE PREFERRED EMBODIMENT

Figure 3:
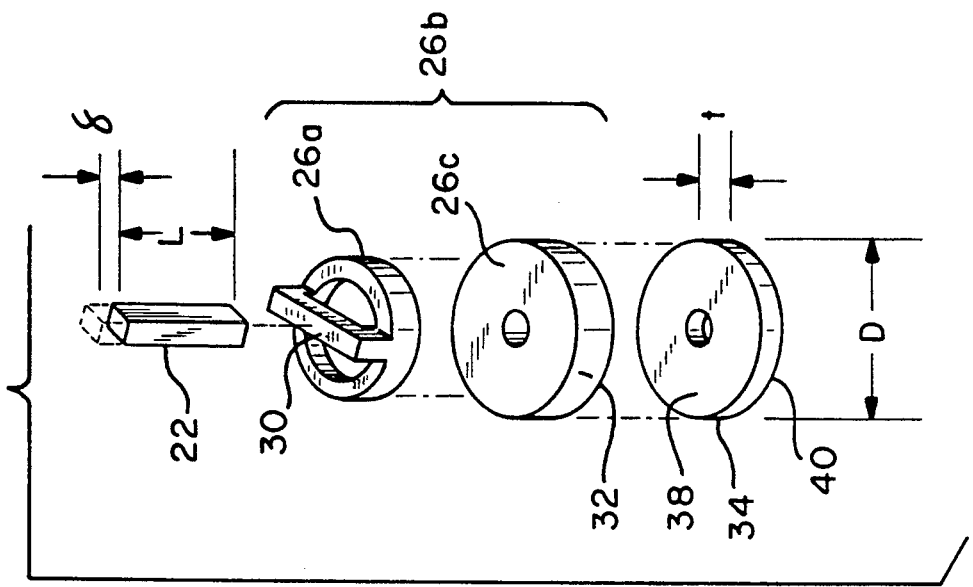
FIG. 3 is an exploded perspective view of the actuator configuration of the first embodiment of FIG. 2.

Referring to FIGS. 1A-3, the gas regulator 20 of the present invention utilizes the magnetostrictive, electrostrictive or piezoelectric properties of several ceramic materials and alloys. Electrostrictive and piezoelectric materials display relatively large induced strains, $\delta/L$, under the action of an applied electric field, E, while magnetostrictive materials .r display relatively large induced strains upon application of a magnetic field, $\beta$. As shown in FIG. 3, $\delta$, is the incremental change in the dimension, L, of an actuator 22 made of electrostrictive, piezoelectric, or magnetostrictive material. The dimension L thus, generally indicates the length of any actuator 22. The present invention uses the dimensional change, $\delta$, which results in such materials to control the diameter of an orifice 36 in an elastomeric element, elastomer 34. Dimensional change, $\delta$, shown in FIG. 1C as $\delta_1$ and $\delta_2$, representing different applied fields E (or $\beta$), is used to compress elastomer 34 and extrude a portion of the elastomeric material into the orifice 36. To achieve this effect, the regulator of the present invention also uses elastomer 34 to amplify the dimensional change induced in these materials.

Thus, potentially three different materials may be used to apply force in accordance with the present invention: the electrostrictive, piezoelectric, and magnetostrictive materials. The electrostrictive effect, while found in a number of materials, is largest in ferroelectric-type materials. Piezoelectric effects are found in many materials, for example quartz, but such effects are smaller than in electrostrictive materials, and typically have large hysteresis as well as substantial aging effects. Magnetoelectric effects are found in rare earth alloys, such as Terfenol-D ® and other alloys made by Edge Technologies, Ames, Iowa. While magnetostrictive effects appear to be generally as large or larger than those in electrostrictive materials, cost and availability are concerns. As well, the inducement of magnetostrictive effects require application of a magnetic field and attendant current demands increase the operating cost. As the electrostrictive effect is anhysteretic, generally larger than the piezoelectric effect, and cost-effective electrostrictive materials are more readily available commercially, electrostrictive materials are preferred.

Thus, while the present invention will be described in terms of electrostrictive ceramic materials, it will be understood that reference to electrostrictive materials in this specification will include high strain capability materials, electrostrictive, piezoelectric, and magnetostrictive materials, to the extent applicable.

Strains, $\delta/L$, which may be induced in electrostrictive materials under the action of an applied electric field, E, may be expressed in accordance with Eq. 1 where $\delta$ is the incremental change of the dimension L, according to which $$(\delta/L)_i = Q_{ij} P_j^2 \qquad (1)$$

where $Q_{ij}$ is the electrostrictive coefficient and $P_j$ is the polarization introduced by the field $E_j$. The subscripts i and j in Eq. (1) reflect the fact that the electrostrictive effect occurs three-dimensionally throughout the solid. Thus, $$(\delta/L)_{perp} = Q_{12} P^2 \qquad (2)$$

$$(\delta/L)_{para} = Q_{11} P^2 \qquad (3)$$

where $(\delta/L)_{perp}$ and $(\delta/L)_{para}$ are the strains induced perpendicular and parallel to the polarization, respectively.

The polarization is related to the electric field by $$P = \epsilon_0 \epsilon(E) E \qquad (4)$$

where $\epsilon_0$ and $\epsilon$ are the dielectric permittivities of free space and of the electrostrictive material, respectively, and $\epsilon$ is E-field dependent. Therefore, for an isotropic ceramic body as used in the present invention, $$(\delta/L)_{perp} = \epsilon_0^2 \epsilon^2(E) Q_{12} E^2 \qquad (5)$$

$$(\delta/L)_{para} = \epsilon_0^2 \epsilon^2(E) Q_{11} E^2 \qquad (6)$$

Electrostrictive effects induced in electrostrictive materials may be positive or negative. In some materials, positive strains are induced perpendicular to the applied electric field, while in others, positive strains are parallel to the applied electric field. In the preferred electrostrictive materials, PMNT, illustrated in FIG. 1B, the electrostrictive strains in the $X_1$ direction, parallel to the polarization in the electrostrictive ceramic body 24, are positive, and the strains in the $X_2$ direction, perpendicular to the polarization, are negative, and are approximately one-half the absolute value of strains in the $X_1$ direction. Thus, upon application of an electric field the electrostrictive material (or piezoelectric material) expands in one dimension and retracts in two dimensions. In like fashion, upon application of a magnetic field, magnetostrictive material will expand in one dimension while retracting in the others.

As noted above and illustrated in FIG. 1C, the regulator of the present invention further utilizes elastomer 34 to amplify the dimensional changes induced in electrostrictive, piezoelectric or magnetostrictive actuator(s) 22 to vary the diameter of orifice 36. FIGS. 2-5 illustrate the basic elements of two embodiments for the solid-state regulator 20 of the present invention. Expansion of actuator(s) 22 under a strain inducing field compresses elastomer 34 via means 26 for distributing pressure. Housing 42 provides a means for constraining these elements so that the electrostrictive strain from actuator(s) 22 is used entirely, or as nearly so as possible, to compress elastomer 34.

There are two, independent motion-amplification factors associated with compression of elastomer 34. Those factors are the diameter, D, and the thickness, t, of elastomer 34, as shown in FIGS. 1C and 3. Their effect on the diameter of orifice 36 may be examined with reference to Eq. 7. Equating the change in volume of actuator 22 with the change in volume of orifice 36, Eq. 7 defines the orifice diameters, $d_E$ and $d_O$, where $d_E$ and $d_O$ represent the orifice diameters with and without an applied voltage, $$d^2_E / d^2_O = 1 - (\lambda x_1 / t)(D^2 / d^2_O + d^2_O / D^2 - 2) \qquad (7)$$

and where $x_1$ is the voltage-dependent strain $(\delta/L)_{para}$ of actuator(s) 22. In Eq. 7, elastomer 34 is considered as an incompressible fluid, and a Taylor expansion has been used for the terms containing $\lambda x_1 / t$, the dimension change of actuator(s) 22, and $\lambda$ is the length of the illustrative electrostrictive actuator.

By inspection of Eq. 7, it may be understood that the larger D becomes and, independently, the smaller t becomes, the smaller the ratio $d_E / d_O$ becomes. By way of example, not limitation, the motion amplification may be illustrated by practical dimensions. For example, if $D \approx 2$ inches, $d_O \approx 0.2$ inches, and $t \approx 0.05$ inches, then the dimensional change of the actuator(s), $\lambda x_1$, is amplified by about 2000 by the term $(D/d_O)^2/t$ in Eq. 7.

A primary difference between the first and second embodiments of FIGS. 2-3 and 4-6, respectively, is the use of one versus three actuators 22, respectively. The actuators 22 in the second embodiment will thereby exert three times more pressure on elastomer 34 than in the first embodiment. Similarly, other actuator configurations, such as in FIGS. 7 and, 8, may be used to apply different pressures to elastomer 34. The durometer value of elastomer 34 may also be varied to provide the most effective motion amplification for a particular application.

In general, elastomer 34 must have a durometer value low enough to avoid very large deformation pressures yet high enough to maintain the mechanical integrity of orifice 36. Further, elastomer 34 is preferably comprised of a material which does not outgas, such as various forms of polysiloxanes, known commercially as silicone rubbers, to avoid decomposition of the elastomer. Silicone rubbers are preferred and are commercially available from Variseal Mfg. Inc., of Parkman, Ohio. Another useful elastomer form is a multi-component structure, such as liquid- or polysiloxane-filled elastomeric bladders available from Woodstock Plastics, Inc. of Marengo, Ill.

The preferred electrostrictive material is ferroelectric lead-magnesium-niobate with 10% lead titanate (PMNT). The measured electrostrictive strains in this material range up to 0.1%, as reported by S.J. Jang, K. Uchino, S. Nomura, and L.E. Cross, Ferroelectrics 27, 35 (1980) and K. Uchino, S. Nomura, L.E. Cross, R.E. Newnham, and S.J. Jang, J. Mat. Sci. 16, 569 (1981), and shown in FIG. 16. The preferred piezoelectric materials are the family of lead-zirconate-titanates which materials may be expressed by $Pb(Zr,Ti)O_3$. The preferred magnetostrictive material is ETREMA Terfenol-D ®, $Tb_x Dy_{1-x} Fe_{1.9-1.98}$ available from Edge Technologies, Ames, Iowa, which reports measured magnetostrictive strains up to 0.2%. It will be recognized, of course, that although the lead-containing electrostrictive ceramics are preferred because they are particularly suited for the gas regulator of the present invention, having a large, anhysteretic electrostrictive effect, and being more readily available and cost-effective, the regulator may be constructed using other suitable electrostrictive materials, piezoelectric ceramics, or magnetostrictive materials. In particular, other electrostrictive ceramic materials which may be used in the present invention, include materials which may be expressed by $PbMO_3$, were M is a member selected from the group consisting of $(Mg_{\frac{1}{3}}Nb_{\frac{2}{3}})$, and $(Sc_{\frac{1}{2}}Ta_{\frac{1}{2}})$, or appropriate combinations thereof. As well, other magnetostrictive materials which may be used in the present invention are magnetostrictive rare earth element alloys, such as $TbTe_2$, $Tb_xDy_{1-x}Fe_2$, $Tb_xDy_{1-x}Fe1.9-1.98$, or appropriate combinations thereof.

Figure 16:
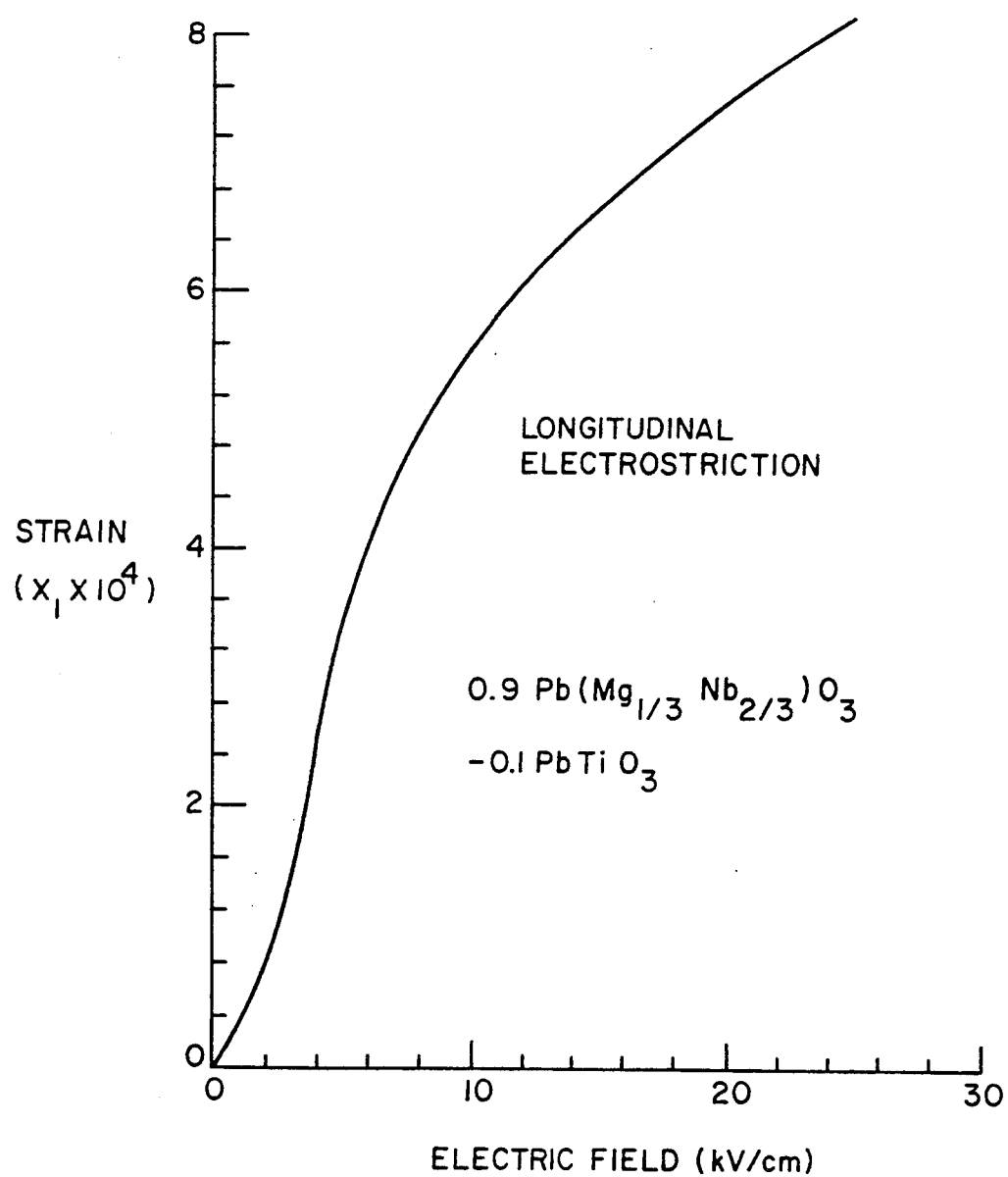
FIG. 16 is a graph of strain as a function of electric field applied for the preferred electrostrictive ceramic material PMNT.

Referring now to FIG. 16, a strain-electric field graph typical of the most preferred of the materials, PMNT, is presented showing the dependance of strain on the electric field applied. At relatively low operating frequencies, on the order of one kilohertz, $\epsilon$ achieves very large values, on the order of 20,000, the electrostrictive coefficient $Q_{ij}$, may be relatively modest, but the strains very large. This is because of the multiplying $\epsilon^2$ factor, as shown in Eqs. (5) and (6). See S.J. Jang, K. Uchino, S. Nomura, and L.E. Cross, Ferroelectrics 27, 35 (1980) and K. Uchino, S. Nomura, L.E. Cross, R.E. Newnham, and S.J. Jang, J. Mat. Sci. 16, 569 (1981). As a result, these materials achieve transverse strains in the area of $6 \times 10^{-4}$ at kHz frequencies in the neighborhood of the transition temperature $T_c$ for E-field strength of approximately 20 kV/cm. Moreover, as is well-known in the ceramic art, the transition temperature $T_c$ can be widely adjusted by using appropriate solid solutions of the ceramic materials set out above, including adjusting $T_c$ to 25° C. In a particular application such variation may be used to select a material whose E-field maximizes strains induced at operating temperatures.

As previously discussed above, the large positive electrostrictive (piezoelectric or magnetostrictive) strains obtainable with these materials are preferably used to compress an elastomer 34 having an orifice 36 to extrude elastomeric material into orifice 36 to vary its size. In the preferred embodiment, it may be seen from FIG. 1B that the $Q_{11}$ coefficient of Eq. (5) is involved, and the electrostrictive displacement is parallel to the electric-field direction. Alternatively, elastomer 34 may be initially compressed in regulator 20, and the large negative $Q_{12}$ strains used to relieve compression to open orifice 36. Thus, depending on the desired configuration and function, either expansion or contraction of the ceramic material may be used in regulator 20 to vary the orifice size.

Figure 1B:
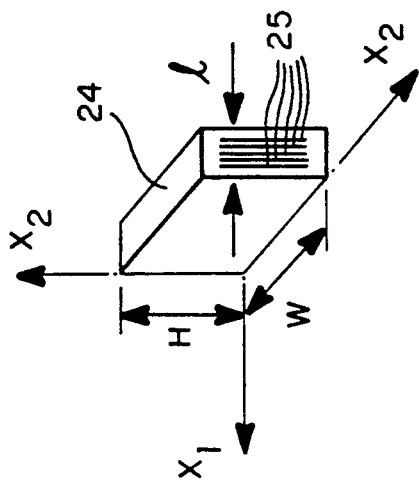
FIG. 1B is a schematic perspective view of a block of electrostrictive ceramic material.
Figure 1C:
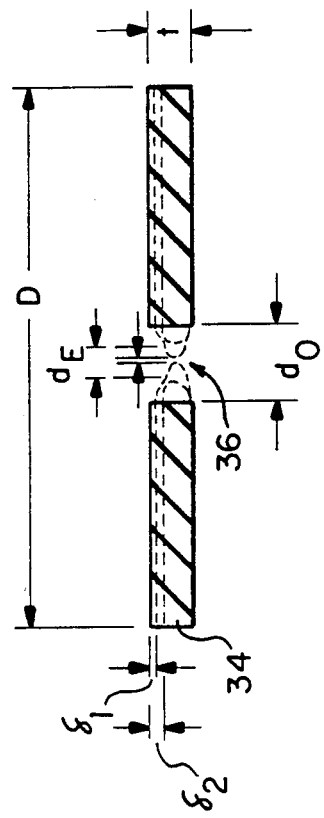
FIG. 1C is a cross-sectional view of the elastomer of the present invention taken along line 1C—1C in FIG. 1A, showing the extrusion of elastomeric material upon compression.
Figure 1A:
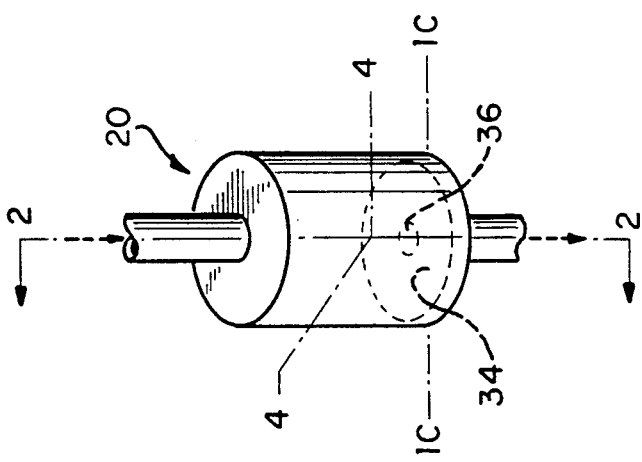
FIG. 1A is a schematic perspective view of the regulator of the present invention.

The preferred means for applying electric fields to the electrostrictive material is by metallic plate electrodes 25 interspersed within each block of ceramic material 24, as best illustrated in FIG. 1B. Multilayering of plate electrodes 25 is well-known in the art for manufacture of ceramic capacitors, and blocks with interspersed electrodes 25 may be preferably constructed by known "tape-casting" methods. Such methods are discussed by L.J. Bowen, T. Shrout, W.A. Schulze, and J.V. Biggers, Ferroelectrics 27, 59 (1980); and K. Uchino, T. Takasu, H. Yamamura, and B.M. Song, Proc. Meeting of Phys. Soc. Jpn. 1p-U5-4, 1985. In accordance with known methods, the plate electrodes 25 are typically separated by ceramic material of approximately $2 \times 10^{-3}$ to $10^{-2}$ cm thickness, referred to as the dielectric thickness. Consequently, the voltage supply for a regulator according to the preferred embodiment could typically be in the range from 10 to 100 volts, depending on the application, although variation from this range is also contemplated as these types of capacitors are generally rated above 100 volts. It will be recognized that each block of ceramic material 24, in fact, includes two alternating sets of plate electrodes 25, with one set for voltage and the other for ground. All ground plate electrodes 25 may be wired in common. Such plate electrodes 25 are representatively shown in FIGS. 1B, 2, 4 and 9-11.

The response time of the regulator will in general be RC, where C is the capacitance of the actuator(s) and R is the lead resistance in the circuit. For the single actuator case of the first embodiment, in a typical application with a dielectric thickness of $2 \times 10^{-3}$ to $10^{-2}$ cm, the capacitance will be $\approx 5$ microfarads. Since lead resistances are usually a few ohms, the response time will be $\approx 10$ microseconds.

One or more blocks of ceramic material 24 may be used to produce each actuator 22. Alternatively, it will be recognized that each actuator 22 may be constructed with a single block of the electrostrictive (or piezoelectric or magnetostrictive) material. Regardless, in the tape-casting manufacturing method used to make such actuators, there is a so-called "pullback" region of unelectroded ceramic that is necessary to maintain the physical integrity of the actuator. This pullback region has the effect of "clamping" the $x_2$ strain component more than the $x_1$ strain component. Consequently, the $x_1$ component more closely approaches the reported strain values measured for the pure ceramic materials, making the useful behavior of $x_1$ strain component of the electrostrictive material more predictable and attractive.

Although not preferred, use of the magnetostrictive materials in actuator 22 requires applying a magnetic field to the actuator. Fields in the range of 500-3000 Oersted may be required to obtain significant effects, and may be created by known means such as a coil (not shown) wound around actuator 22. Such a coil is preferably insulated and isolated from contact with the gas stream passing through regulator 20.

As well, although not preferred, actuator 22 of the present invention may be made of piezoelectric materials. In such applications, the embodiments and configurations as shown and described remain essentially unchanged. The necessary electrical supply to operate an actuator made of the preferred piezoelectric material would require voltages in the ranges known in the art to obtain the desired strains in the electrostrictive material chosen.

Figure 2:
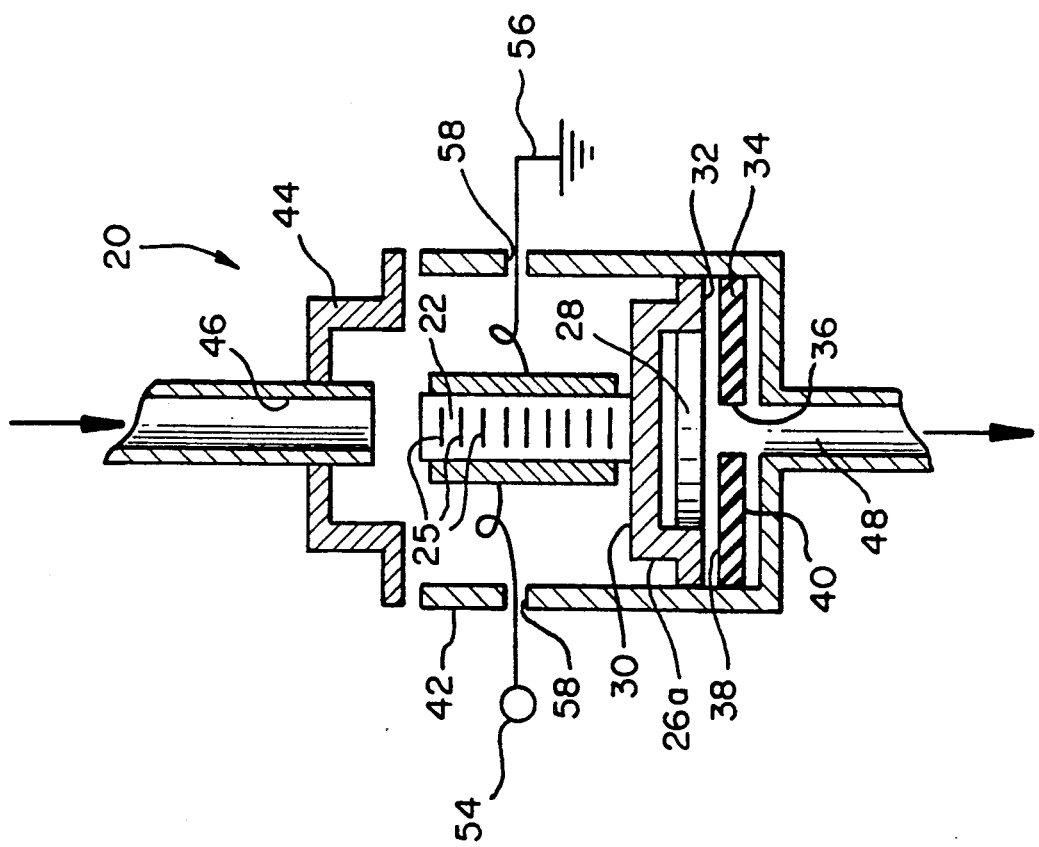
FIG. 2 is a schematic cross-sectional view of the regulator of the present invention in a first embodiment taken along line 2—2 in FIG. 1A.
Figure 5:
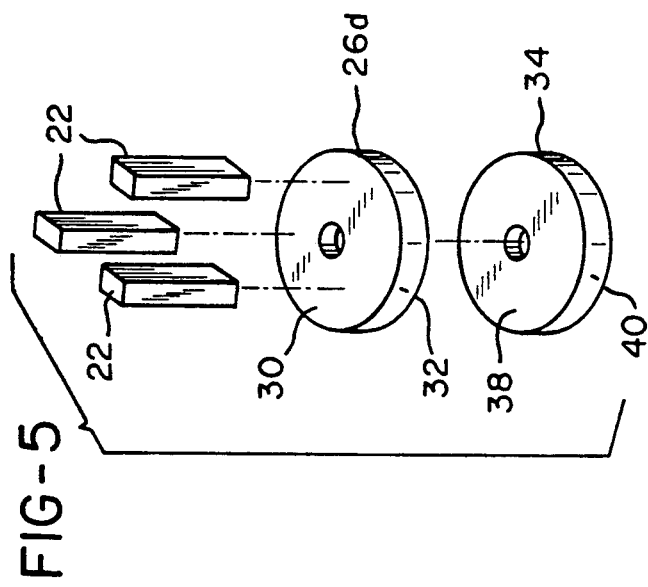
FIG. 5 is an exploded perspective view of the actuator configuration of the second embodiment of FIG. 4.

In accordance with a first embodiment of the present invention, as shown in FIG. 2, the regulator 20 of present invention includes an actuator 22, made of one or more blocks of ceramic material 24. Actuator 22 has a first and second end. Means 26 for distributing pressure are disposed at the first end of actuator 22. Means 26 for distributing pressure typically includes an aperture 28 and first and second seating surfaces 30, 32. An elastomer 34 is disposed along second seating surface 32, and includes an orifice 36. Orifice 36 extends from a first elastomer surface 38, preferably the surface disposed along second seating surface 32, to a second elastomer surface 40. Actuator 22 and elastomer 34 are constrained by means for constraining, such as housing 42 shown. Application of an electric field to actuator 22 causes its displacement against means 26 for distributing pressure, which in turn compresses elastomer 34, causing it to extrude into orifice 36, varying the size of orifice 36.

Variations in the particular design of the first embodiment of FIG. 2 are possible. For example, means 26 for distributing pressure may be a one-piece yoke-washer 26a, as shown in FIG. 2, or a two-piece assembly 26b as shown in FIG. 3. Regardless, means 26 for distributing pressure serves to spread the force exerted by actuator 22 evenly across first elastomer surface 38. Orifice 36 may also extend from a first surface 38 on the periphery of elastomer 34 to second surface 40. Housing 42 may include a bushing 44, manifolded as shown in FIG. 2, or include a first, inlet opening 46 which may be off-set (not shown) to allow gas into housing 42. Housing 42 also includes a second, outlet opening 48. Bushing 44 may be connected to housing 42 by bolting, threaded joints, or other known means, and the connection may be further facilitated by o-rings or machined surfaces.

Figure 6:
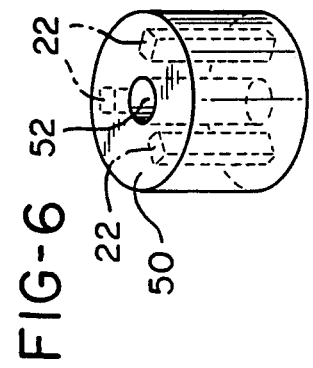
FIG. 6 is a partial schematic view of the actuators of FIG. 5 potted in an elastomeric harness.
Figure 4:
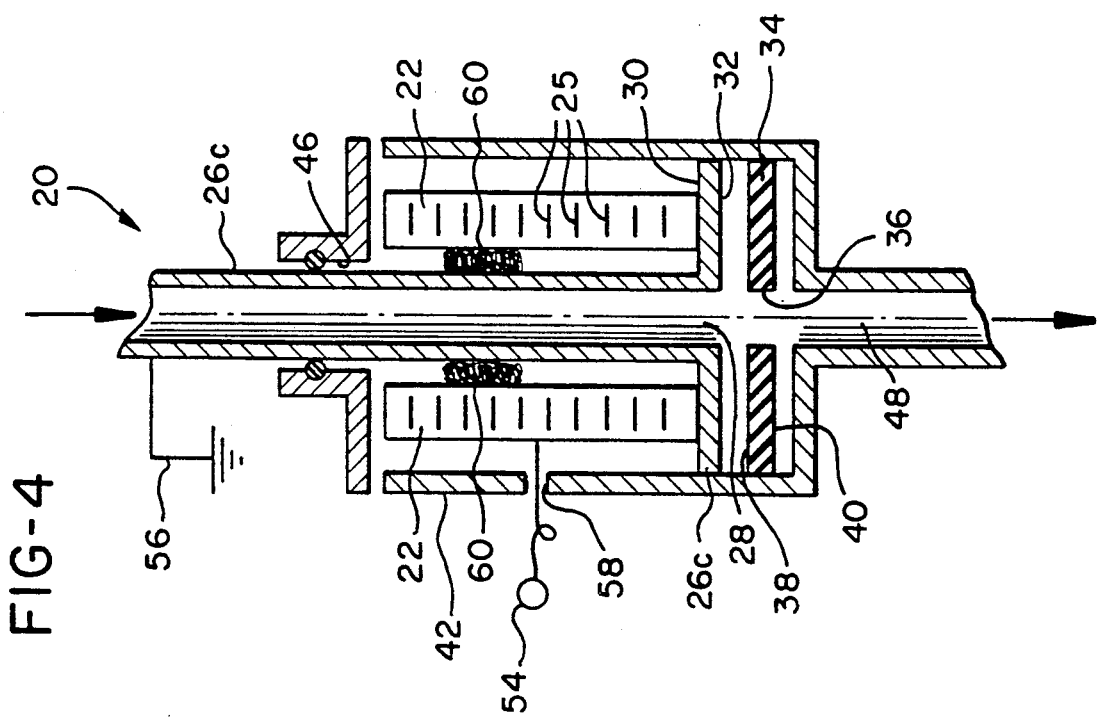
FIG. 4 is a schematic cross-sectional view of the regulator of the present invention in a second embodiment taken along line 4—4 in FIG. 1A.

A second embodiment of the present invention is shown in FIGS. 4 where three actuators 22 are provided. As shown, in FIGS. 4 and 5, actuators 22 are spaced generally equally around first seating surface 30 of means 26 for distributing pressure, shown as a tube-flange 26c or slug washer 26d, respectively. Actuators 22 are preferably of the same length to avoid creating shear forces in the ceramic material. In the second embodiment, care must also be taken that the tube portion of tube-flange 26c is secured in alignment to avoid sideways forces which could interfere with the operation of regulator 20 or create shear forces in actuator 22. Preferably, actuators 22 are potted in an elastomeric harness 50, as shown in FIG. 6, which defines a central channel 52 in general alignment with aperture 28, orifice 36, and outlet opening 48. Regardless, use of three actuators in accordance with FIG. 4–6 would be somewhat more costly than the single actuator of FIGS. 2–3.

Figure 8:
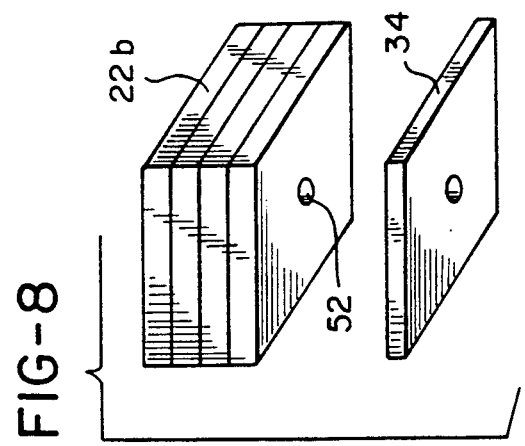
FIG. 8 is a partial schematic view of an alternative configuration of actuators.
Figure 7:
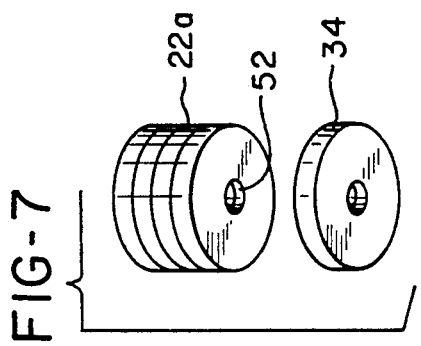
FIG. 7 is a partial schematic view of an alternative configuration of actuators.

Alternative configurations for the actuator(s) 22, useful in either the first or second embodiment, are shown in FIGS. 7 and 8. FIG. 7 shows a cylindrical actuator 22a which includes a central channel 52, while FIG. 8, similarly, shows a rectangular or square actuator 22b including a central channel 52. In each of these alternative configurations, actuator 22a or 22b may be sufficiently broad at its second end that means 26 for distributing pressure may be eliminated from the structure of regulator 20. Where a single actuator 22a or 22b is provided, the first and second ends of actuator 22a or 22b are preferably plane parallel to avoid shear forces.

Means for applying an electric field include connection of actuators 22 (or 22a or 22b) to a power source by various means, depending on the actuator type and configuration used. In applying an electric field, the oppositely charged plate electrodes 25 in ceramic material 24 should be electrically isolated. The leads 54, 56 should also be isolated from exposure to the gas being regulated. Where magnetostrictive actuators 22 are used, a coil (not shown) may be wrapped around actuator 22 to produce the desired magnetic field. The coil, as well, is preferably insulated and isolated from the gas stream.

In the first embodiment of FIG. 2, both the high voltage lead 54 and ground lead 56 are insulated (not shown) and pass through potted holes 58 in housing 42. The outer surfaces of actuator 22 are insulated (not shown), and high voltage and ground leads 54, 56 are connected on different surfaces of the actuator 22 where the plate electrodes 25 are interconnected in parallel.

In the second embodiment of FIG. 4, connection of actuators 22 (or 22a or 22b) is preferably accomplished by inserting copper wool 60 between the surfaces (or inner diameters) of actuator 22 (or harness 50, actuator 22a, or 22b) and the outer diameter of the tube portion of tube-flange 26c. The tube portion makes the electrical connection to ground, and is isolated from housing 42 by typical means, such as an o-ring seal, as shown, or a packing. Where actuators 22 are potted in harness 50, as in FIG. 6, common ground leads (not shown) from actuators 22 are inserted in copper wool 60. Again, high-voltage lead 54 passes through one or more potted holes 58 in housing 42.

In either the first or second embodiment, regulator 22 may alternatively be assembled to place elastomer 34 and actuators 22 (or 22a or 22b) in compression, with actuators 22 oriented and connected to provide negative displacement in the $X_2$ direction. Thus, application of an electric field relieves the compression of elastomer 34 to vary the orifice diameter. This negative displacement of actuators 22 is one-half that of positive displacement, and thus the range of variation in orifice diameter is correspondingly more limited.

Figure 9:
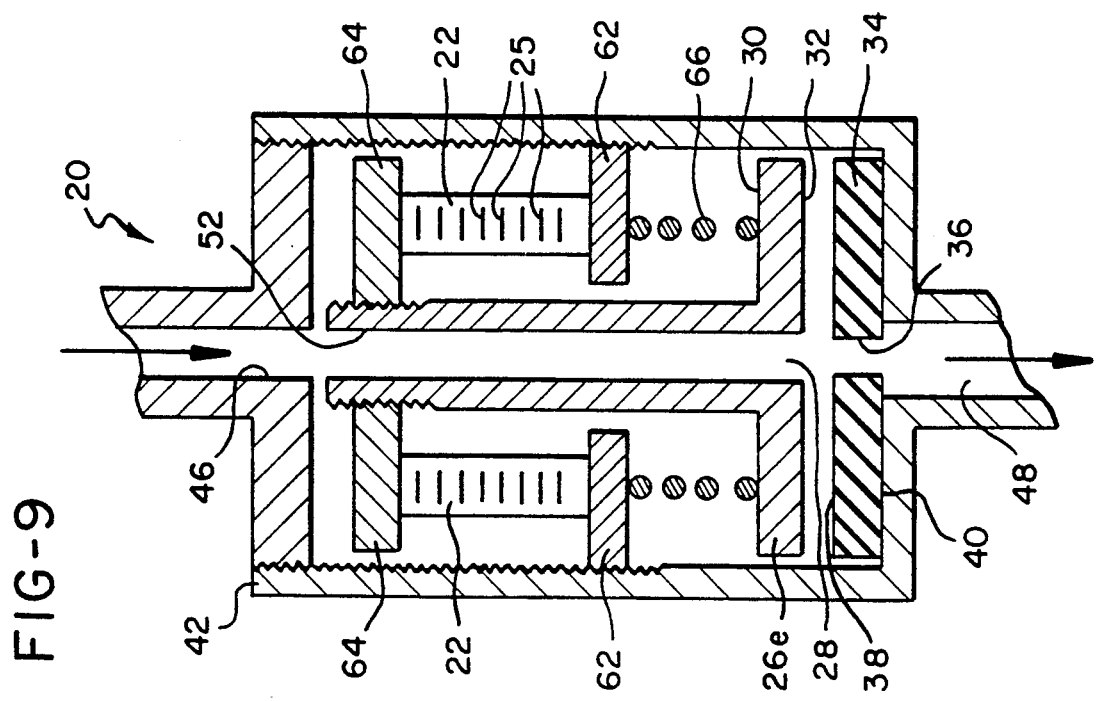
FIG. 9 is a schematic cross-sectional view of a third embodiment of the regulator of the present invention taken along line 4—4 in FIG. 1A.

A third embodiment of the present invention, shown in FIG. 9, further illustrates a regulator 20 which can be placed in a normally closed, or normally restricted configuration, but uses positive displacement of actuator(s) 22 to vary the diameter of orifice 36. In accordance with the third embodiment, preferably three actuators 22 (or, alternatively, one or more actuators 22a or 22b) are provided, and may be potted in an elastomeric harness 50. As before, actuators 22 are spaced generally equally around the means 26 for distributing pressure, shown here as nipple-flange 26e, and are mounted between first and second bushings 62, 64.

In the third embodiment of the invention shown in FIG. 9, first bushing 62 is attached to the inner surface of housing 42 and extends inward, having a large central opening. Second bushing 64 is attached to the nipple portion at the second end of nipple-flange 26e, and extends towards the inner wall of housing 42. Nipple-flange 26e preferably defines a central channel 52 in general alignment with aperture 28, orifice 36, and outlet opening 48. The first end of nipple-flange 26e includes first and second seating surfaces 30, 32. Spring 66 is disposed in compression between first seating surface 30 and first bushing 62. First and second bushings 62, 64 are, preferably, adjustably positionable, for example, when mounted by threaded connections as shown. Electrical connection is preferably made in a manner described with respect to the first embodiment.

In operation of the third embodiment, when no electric field is applied to actuator 22, spring 66 exerts sufficient force to compress elastomer 34 and extrude elastomer 34 to close or substantially narrow orifice 36. Upon application of an electric field, actuator 22 displaces in a positive direction and lifts nipple-flange 26e, reducing pressure on elastomer 34, allowing orifice 36 to expand.

Alternatively, in the third embodiment, regulator 20 may be assembled so that elastomer 34 is not in compression, but upon application of an electric field, actuator 22 displaces in a negative direction, compressing elastomer 34 in cooperation with spring 66. In this arrangement, actuator 22 may provide sufficient force as connected to first and second bushings 62, 64, to permit elimination of spring 66.

Figure 10:
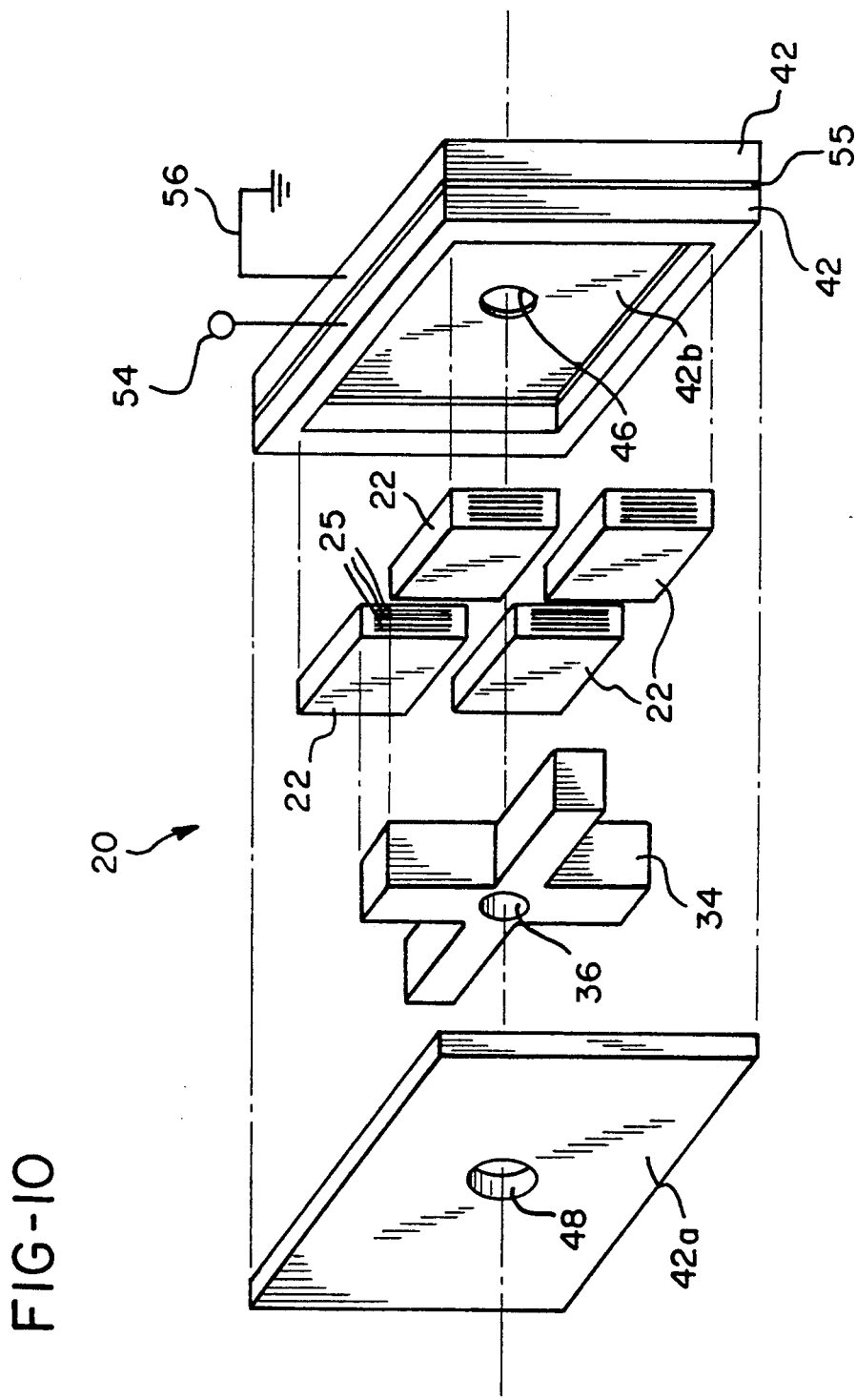
FIG. 10 is an exploded view of a fourth embodiment of the regulator of the present invention.

A fourth alternative embodiment of regulator 22 is shown in FIG. 10. In this configuration elastomer 34 includes one or more excised areas in which actuators 22 may be placed. Preferably, elastomer 34 has a cross design with four excised areas, as shown in FIG. 10. In this embodiment, it is preferred to assemble elastomer 34 in compression in housing 42, so that elastomer 34 is extruded into orifice 36 to close or substantially restrict orifice 36. Actuators 22 are positioned and electrically connected at opposite faces to housing panels 42a, 42b, which are electrically isolated by insulation 55. Housing panels 42a, 42b connect to voltage and ground leads 54, 56, respectively. Application of an electric field causes negative displacement of actuator 22, relieving the pressure on elastomer 34, and causing orifice 36 to open or widen.

Alternatively, as shown in FIG. 11, two actuators 22 may be provided, positioned and connected to displace negatively or positively to relieve or compress, respectively, elastomer 34.

Figure 12A:
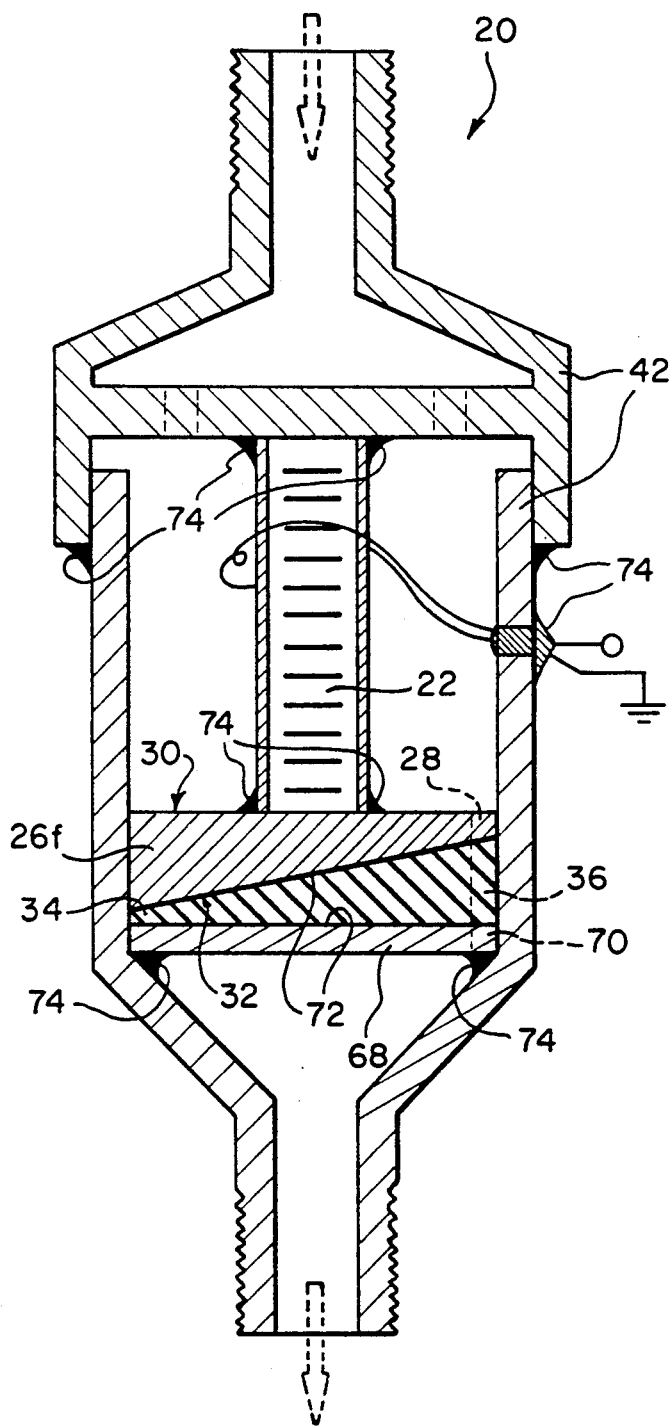
FIG. 12A is a schematic cross-sectional view of a fifth embodiment of the regulator of the present invention taken along line 2—2 in FIG. 1A.
Figure 12B:
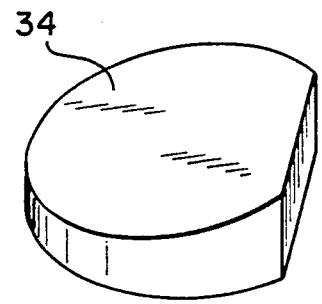
FIG. 12B is a detail schematic view of the wedge-shaped elastomer of FIG. 12A showing its non-circular orifice.

In accordance with a fifth embodiment of the present invention, as shown in FIGS. 12A and 12B, the regulator 20 includes an elastomer 34 which has an orifice 36 which is a noncircular opening, such as a segment or chord removed from the circular elastomer 34 for fluid flow. Orifice 36 is preferably an opening defined by a chord of the circular elastomer 34, and is located at the edge of the elastomer 34. Elastomer 34 is, further, preferably wedge-shaped. As in the first embodiment, the regulator 20 of present invention includes an actuator 22, and means 26 for distributing pressure disposed at the first end of actuator 22. In the fifth embodiment means 26 for distributing pressure is preferably a wedge-shaped upper washer 26f. Elastomer 34 is disposed along second seating surface 32 of means 26 for distributing pressure, as before. However, the means 26 for distributing pressure includes an aperture 28 of similar shape and location as orifice 36. Actuator 22 and elastomer 34 are constrained by means for constraining, such as housing 42 shown. As shown in FIG. 12A, the housing 42 further includes a lower washer 68 which provides a surface against which means 26 for distributing pressure compresses elastomer 34. Lower washer 68 includes an aperture 70 of similar shape and location as orifice 36. The outer diameters of the means 26 for distributing pressure, upper washer 26f, and lower washer 68 and elastomer 34 are preferably made to tight tolerances. The components of regulator 20 and its housing 42 are preferably assembled with epoxy which forms epoxy seals 74 which are inert with regard to the gas intended to be used. A suitable epoxy is Locktite Weld #14600 available from Locktite Corp., Cleveland, Ohio.

The fifth embodiment of the present invention has the advantage of allowing an expansion or extrusion of the free edge surface of the elastomer 34 at the orifice 36. By contrast, compression of an elastomer 34 having a central orifice 36 causes contraction of the free edge surfaces of the elastomer and the extrusion may be resisted by larger resistive forces such as surface-tension. The fifth embodiment has the further advantage of eliminating the need for specially manifolded parts such as one-piece yoke-washer 26a (see FIG. 2) and the elastomeric harness 50 (see FIG. 6). As well, use of an orifice 36 along the edge of the elastomer 34 in accordance with the fifth embodiment facilitates the advantageous use of a wedge-shaped elastomer 34. The corresponding wedge shape of the means 26 for distributing pressure also advantageously prevents unintended rotation of the elastomer 34 relative to the means 26 for distributing pressure and lower washer 68, thus maintaining alignment of the orifice 36 with their respective apertures 28 and 70. As may be seen in FIG. 12A, application of an electric field to actuator 22 will cause its displacement against means 26 for distributing pressure, which will in turn compress elastomer 34 against lower washer 68, causing elastomer 34 to extrude into orifice 36, varying the size of orifice 36.

Further, in accordance with the fifth embodiment, to insure that the elastomer 34 has sufficient restoring force to return to its initial position and open orifice 34 fully after compression, regulator 20 may include means for restoring elastomer 34. The means for restoring may be a return spring (not shown) cast in the elastomer 34. Another, preferred, means for restoring force is a thin layer of grease 72 applied to both the first and second elastomer surfaces 38, 40. As two surfaces greased together can only be separated in shear rather than in tension, the retraction of actuator 22 and means 26 for distributing pressure will provide restoring force to the elastomer 34, as the first and second elastomer surfaces 38, 40 remain sealed to the upper washer 26f and lower washer 68, respectively.

Generally, each embodiment of the present invention is sensitive to temperature. Because the elongation of actuator 22 induced in accordance with the present invention is small, the combination of temperature effects on the length of materials used in the regulator 20 may cause significant compression or tensioning of the elastomer 34. Temperature changes on the materials of the elastomer 34, actuator 22, housing 42 and means 26 for distributing pressure parallel to the long axis of the actuator 22 will have the greatest effect.

It is preferred, therefore, in practicing the present invention, to match the coefficients of thermal expansion of the various materials so that dimensional changes are consistent or cancel out. By way of example, and not limitation, in a first example pertinent to the first through fourth embodiments of the present invention, a regulator 20 is provided which is approximately 2 inches diameter by 2 inches long. Regulator 20 includes an actuator 22 of PMNT having a length of 2.0 centimeters (cm) (0.787 inches [in]) and a coefficient of thermal expansion, $\alpha_{actuator} = 0.5 \times 10^{-6}/°$ C., and an housing 42 made of free-machining brass having a coefficient of thermal expansion, $a_m = 16.3 \times 10^{-6}/°$ C. Such actuators 22 are commercially available from AVX, Inc., Myrtle Beach, S.C. To provide a regulator 20 which substantially avoids thermal effects, a flat elastomer 34 made of silicone rubber is provided having a coefficient of thermal expansion, $\alpha_{elastomer} = 390 \times 10^{-6}/°$ C. and a thickness, $t = 0.085$ cm (0.033 in). Alternatively, elastomer 34 may be made of butadiene having a coefficient of thermal expansion, $\alpha_{elastomer} = 150 \times 10^{-6}/°$ C. and a thickness, $t = 0.236$ cm (0.093 in). Thus, for example, using such an actuator 22, in a housing 42 of free-machining brass, matched with such an elastomer 34 of silicone, a change in temperature of 10° C. will induce a change in the effective diameter of the orifice 36 of only 0.39%.

In a second example pertinent to the fifth embodiment of the present invention, a regulator 20 is provided which is approximately 2 inches diameter by 2 inches long, and includes an actuator 22 of PMNT having a length of 2.0 centimeters (cm) (0.787 inches [in]) as before. In the second example, housing 42 is made of Ebonite ®, a hard, impact-resistant rubber, having a coefficient of thermal expansion, $a_m = 84.2 \times 10^{-6}/°$ C. To provide a regulator 20 which substantially avoids thermal effects, a wedge-shaped elastomer 34 made of silicone rubber having a coefficient of thermal expansion, $a_{elastomer} = 390 \times 10^{-6}/°$ C. is provided. Elastomer 34 has a thickness at its thinnest edge of, $t_1 = 0.036$ in and a thickness at its thickest edge of $t_2 = 0.217$ in. In a third example, also pertinent to the fifth embodiment, housing 42 may be made of 70 Cu/30 Sn bronze having an $a_m = 29.5 \times 10^{-6}/°$ C., and elastomer 34 may be made of another silicone rubber having a coefficient of thermal expansion, $a_{elastomer} = 250 \times 10^{-6}/°$ C. and a thickness, $t = 0.236$ cm (0.093 in). In this third example, elastomer 34 has a thickness at its thinnest edge of, $t_1 = 0.026$ in and a thickness at its thickest edge of $t_2 = 0.105$ in.

Thus, as may be seen by these examples, proper material choice and design thicknesses can compensate for otherwise deleterious temperature effects. It is preferred that the ratio of $a_{elastomer}/a_m$ is in the range from 8 to 10, although, as seen in the examples 1 and 2, it may vary from this range. Other material combinations and elastomer thicknesses may be used, so long as their net effect upon the orifice due to temperature changes is small, so long as the elastomer thicknesses remain practical, and so long as the motion amplification effect of the elastomer is not compromised.

Figure 13:
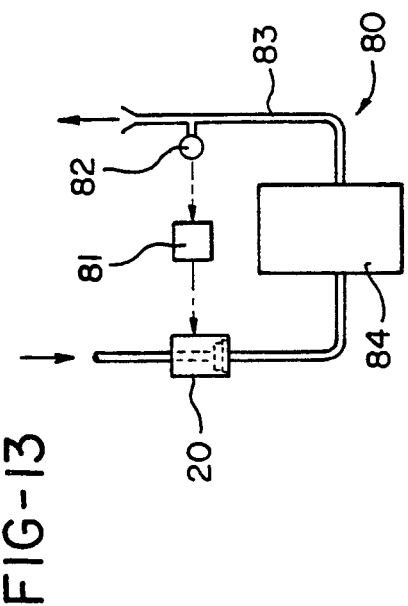
FIG. 13 is a schematic representation of a system in which the gas regulator of the present invention receives electronic feedback to control the flow of gas to a device.

In a further aspect of the present invention, shown representatively in FIG. 13, regulator 20 may be integrated into a control system 80 with a sensor 82 monitoring the operation of a device 84. As shown schematically, an oxygen sensor 82 is placed in the flue 83 of appliance or device 84. An oxygen sensor signal, shown by a dashed line from sensor 82, is used by a microprocessor 81 to vary the voltage applied to the actuator 22 of the regulator 20. In system 80, the electric field (or magnetic field) applied to regulator 20 in response to the sensor signals, is further shown by a dashed line from microprocessor 81. System 80 may be used, thus, as a trimming device to maintain a preprogrammed oxygen level in the flue, or may be used to adjust the regulator 20 to optimize the combustion efficiency of the appliance in accordance with a preprogrammed routine. A control circuit (not shown) as known in the art may be provided rather than microprocessor 81 to provide control signals to regulator 20 in response to the sensor signals. By way of further example, but without intent to limit the scope of such systems applications, regulator 20 could be controlled in response to not only an oxygen sensor in the flue of a natural gas-fired appliance, such as a furnace or oven, but could also be controlled in response to other sensors 82 which indicate other gas partial pressures, to regulate or optimize the result of a process performed with the device 84.

Figure 14:
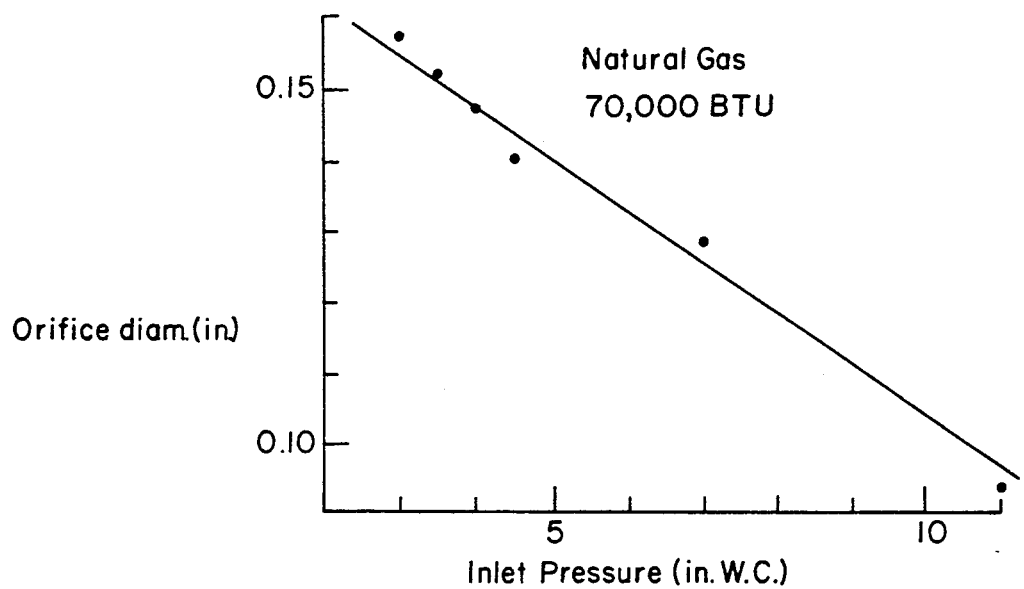
FIG. 14 is a graph showing orifice data for natural gas as a function of inlet pressure at constant BTU.
Figure 15:
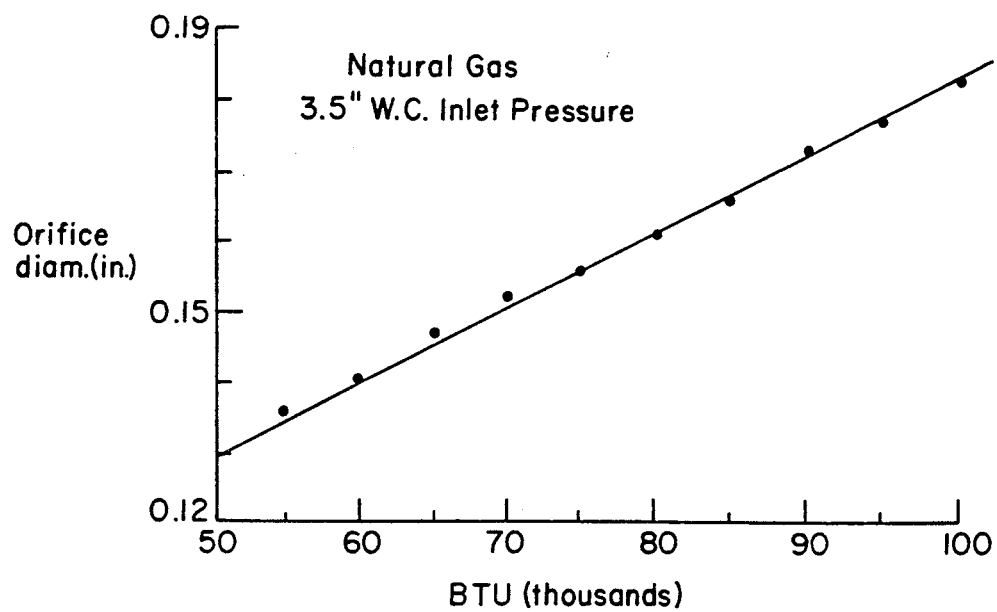
FIG. 15 is a graph showing orifice data for natural gas as a function of BTU at constant inlet pressure.

Pursuing the first example further, it is of interest to illustrate the application of the present invention, without limiting such applications, to a regulator 20 for natural gas. FIGS. 14 and 15 show orifice-calibration data for natural gas. FIG. 14 shows orifice data as a function of inlet pressure at constant BTU, and FIG. 15 shows orifice data as a function of BTU at constant inlet pressure. These orifice diameters are not only relatively small, but also the variations in the diameters are small.

For purposes of illustration, it is assumed that the regulator 20 of FIG. 2 will be used to supply gas to a nominal 70,000 BTU appliance where the inlet pressure is a constant 3.5 inches water column gage (" w.c.). Assuming it is desired to control the supply of gas over the range of 50,000 to 100,000 BTU at constant inlet pressure, as shown in FIG. 15, orifice diameter will vary from 0.13 to 0.183 inches. Reported literature values measuring strain as a function of electric field for the preferred PMNT electrostrictive material, shown in FIG. 16, indicate that a practical dielectric thickness of 0.002 inches, achievable in tape-cast actuators, may be adopted as a practical dimension. For the length of the actuator the practical dimension of $\lambda = 0.787$ inches (2 cm) may also be adopted. Such actuators of PMNT are commercially available from AVX, Inc., Myttle Beach, S.C. Likewise, elastomer 22 may be chosen to have a diameter, $D = 2$ inches, and a thickness, $t = 0.05$ inches. Applied voltages necessary to operate actuator 22 over the range of interest may thus be determined by application of Eq. 7 and inspection of FIG. 16.

Figure 17:
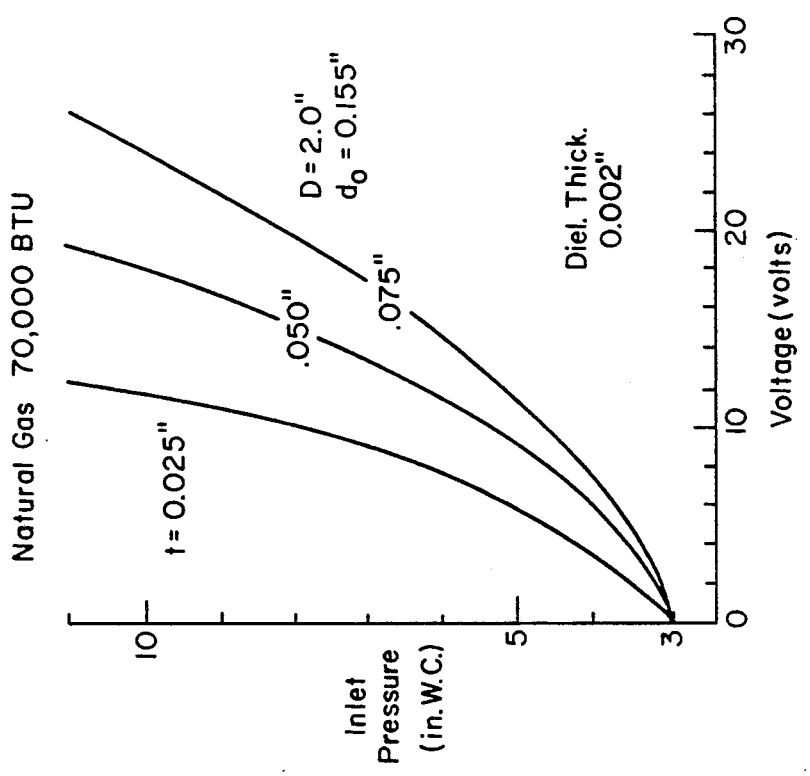
FIG. 17 is a graph estimating the BTU of natural gas as a function of voltage applied to the regulator of the present invention at a constant inlet pressure.

The results of these voltage estimates are shown in FIG. 17, which shows the range of voltage necessary to achieve variations in BTU supplied to the device for elastomers of different thicknesses, t. Operation of a solid-state regulator 20 in this example between 50,000 and 100,000 BTU at a constant inlet pressure requires voltages in the range of 0 to 22 volts, well within the 110+ volts rating of such ceramic actuators. Operation at 70,000 BTU would require approximately 17 volts. Further, it may be estimated by extrapolating from FIG. 16 that the voltage required to completely close orifice 36, so that $d_E = 0$, would be about 51 volts for an elastomer thickness of 0.05 inches.

A second example of interest may be considered where inlet pressures of a natural gas stream vary. Assuming, as above a 70,000 BTU appliance is to be supplied with a minimum inlet pressure of 3" w.c., the orifice diameter, $d_O$, for 70,000 BTU is determined from inspection of FIG. 15 to be $d_O = 0.155$ inches. As the inlet pressure increases, it is desired to close the orifice. Again, choosing a diameter, $D = 2$ inches, and thickness, $t = 0.05$ inches, the applied voltages necessary to operate actuator over a pressure range of interest may be determined for the preferred PMNT material by application of Eq. 7 and the data of FIG. 16.

Figure 18:
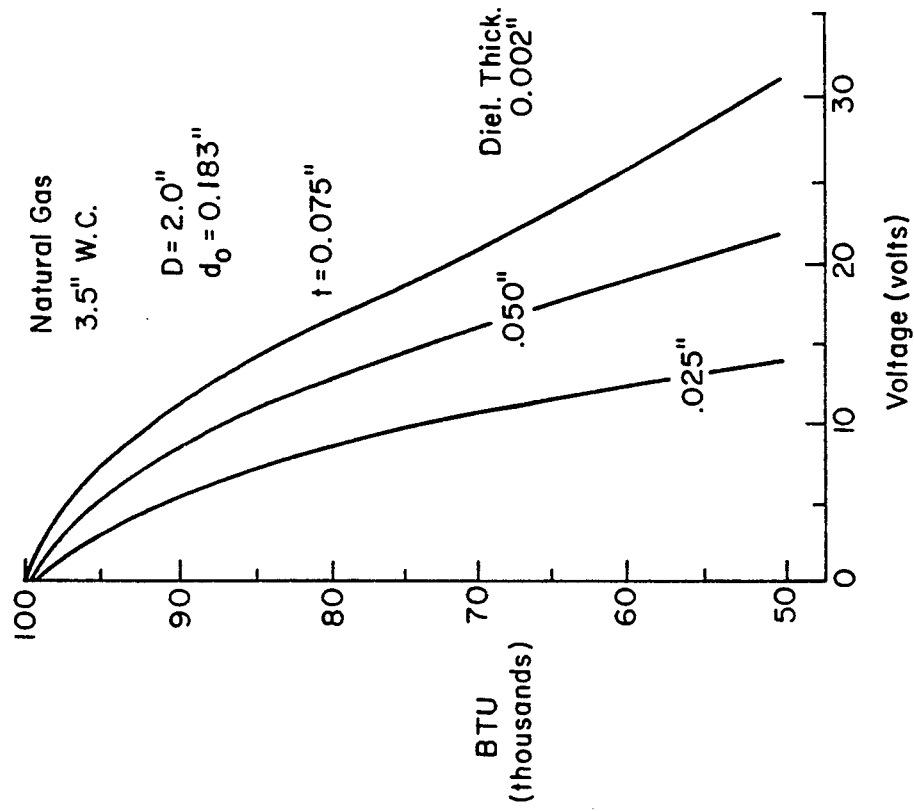
FIG. 18 is a graph estimating the natural gas inlet pressure as a function of voltage applied to the regulator of the present invention for a constant 70,000 BTU demand.

The result of the voltage estimates for this second example over a range of inlet pressures from 3 to 11" w.c. are shown in FIG. 18. Three values of elastomer 34 thickness are also shown, for $t = 0.025$, 0.050, and 0.075. These estimates show the effect of elastomer thickness on motion amplification in addition to indicating the range of voltages required to regulate a constant BTU under varying inlet pressure conditions.

If a signal from a sensor 82 is used to control regulator 20 as indicated in the systems example above, the orifice diameter will be adjusted in real time, and the precise voltage required to achieve a nominal setting is relatively unimportant. For the same reason, any irregularities in the diameter of orifice 36, or the thickness, t, of elastomer 34 will be relatively unimportant.

Power consumption of the regulator may also be estimated. A charging current is involved in applying a voltage to electrostrictive ceramic actuator(s) 22, and may be calculated to be about 0.1 Watt-seconds at 20 volts for a single actuator 22. However, this energy is recoverable on discharging. Under a constant bias voltage, the energy loss comes from the leakage current through actuator(s) 22, and is usually negligibly small. These low power and voltage requirements may be particularly significant in applications where power demands are supplied by batteries.

The above example has been based on orifice calibration data in FIGS. 14 and 15, strain data in FIG. 16, and the embodiment of FIGS. 2-3. Other smaller and larger orifice diameters are possible. Considering the amplification term $(D/d_O)^2/t$ which predominates in Eq. 7, the ratio $D/d_O$ is seen to be a scaling factor, all other things being equal. Reductions in the ratio $d_E/d_O$ can be obtained by varying t, if $D/d_O$ is maintained constant. For larger or smaller orifice diameters, the diameter, D, of elastomer 34 may also be varied. However, because the area of elastomer over which the force applied by actuator 22 increases by $D^2$, a practical limitation may be reached with increasing elastomer diameter, D, where the force available from actuator(s) 22 may be insufficient to produce the full reduction (or increase) in $d_E/d_O$.

While certain representative embodiments and details have been shown and described for purposes of illustrating the invention, it will be apparent to those skilled in the art that various changes in the apparatus disclosed herein may be made without departing from the scope of the invention which is defined in the appended claims.

What is claimed is:

1. An apparatus for regulating fluid flow comprising:
   an actuator comprised of at least one block of magnetostrictive, electrostrictive or piezoelectric ceramic material, said actuator having a first end and a second end;
   an elastomer having an extrudable portion for regulating fluid flow therepast, said elastomer disposed along said second end of said actuator;
   means for applying an infinitely variable strain inducing field to said at least one block; and
   means for constraining said actuator and said elastomer such that application of said infinitely variable strain inducing field to said at least one block causes variable displacement of said actuator and compression of said elastomer, extruding said elastomer to vary the shape of said extrudable portion and regulate fluid flow therepast.

2. An apparatus for regulating fluid flow as recited in claim 1 further comprising means for distributing pressure disposed between said actuator and said elastomer, said means for distributing pressure including first and second seating surfaces, said first seating surface disposed at said second end of said at least one block and said elastomer disposed along said second seating surface.

3. An apparatus for regulating fluid flow as recited in claim 2 wherein:
   said means for constraining said actuator comprises a housing having two or more openings;
   said means for distributing pressure is disposed in said housing;
   said at lest one block of magnetostrictive, electrostrictive or piezoelectric ceramic material is disposed between said housing and said first seating surface of said means for distributing pressure;
   said elastomer is disposed between said housing and said second seating surface of said means for distributing pressure; and
   said extrudable portion of said elastomer is generally aligned with at least one of said openings in said housing.

4. An apparatus for regulating fluid flow as recited in claim 1 wherein:
   said elastomer includes at least one excised area on the periphery thereof; and
   said at least one block of magnetostrictive, electrostrictive or piezoelectric ceramic material is disposed in at least one of said excised areas.

5. An apparatus as recited in claim 1 wherein said electrostrictive ceramic material is $PbMO_3$, M being a member selected from the group consisting of $(Mg_{\frac{1}{3}}Nb_{\frac{2}{3}})$, $(SC_{\frac{1}{2}}Ta_{\frac{1}{2}})$, and combinations thereof.

6. An apparatus as recited in claim 1 wherein said magnetostrictive material is selected from the group consisting of $TbTe_2$, $Tb_xDy_{1-x}Fe_2$, $Tb_xDy_{1-x}Fe_{1.9-1.98}$, and combinations thereof.

7. An apparatus as recited in claim 1 wherein said piezoelectric material is a member selected from the group consisting of $Pb(Zr,Ti)O_3$ ceramics.

8. An apparatus as recited in claim 1 wherein said elastomer comprises polysiloxanes.

9. An apparatus as recited in claim 1 wherein said elastomer comprises a filled bladder structure including a rubbery membrane filled with liquid.

10. An apparatus as recited in claim 1 wherein
    said at least one block is comprised of electrostrictive or piezoelectric material; and
    said means for applying said infinitely variable strain inducing field comprises means for applying an electric field.

11. An apparatus as recited in claim 10 wherein said means for applying an electric field comprises a plurality of metallic plate electrodes disposed in a substantially parallel, spaced relationship within each of said at least one block for applying an electric field to said at least one block.

12. An apparatus as recited in claim 1 wherein
    said at least one block is comprised of magnetostrictive material; and
    said means of applying said infinitely variable strain inducing field comprises means for applying a magnetic field.

13. An apparatus as recited in claim 12 wherein said means for applying a magnetic field comprises a coil disposed around said at least one block for applying a magnetic field to said at least one block.

14. An apparatus as recited in claim 1 wherein said means for applying said strain inducing field is connected to cause positive displacement of said blocks such that extrusion of said elastomer restricts fluid flow.

15. An apparatus as recited in claim 1 wherein said means for applying said strain inducing field is connected to cause negative displacement of said blocks such that negative displacement of said blocks varies the extrusion of said elastomer and the shape of said extrudable portion.

16. An apparatus as recited in claim 1 wherein said at least one block is generally cylindrical in shape.

17. An apparatus as recited in claim 1 wherein:
    said means for constraining comprises a housing having two or more openings;
    said means for distributing pressure comprises a tube having a flange defining said first and second seating surfaces; and
    at least one of said two or more openings is generally aligned with said tube.

18. An apparatus as recited in claim 1 wherein said actuator is comprised of thin, generally rectangular blocks.

19. An apparatus as recited in claim 1 further comprising a means for distributing pressure disposed between said second end of said actuator and said elastomer.

20. An apparatus as recited in claim 1 wherein said actuator defines at least a portion of a channel therethrough.

21. An apparatus as recited in claim 20 wherein a portion of said channel and said extrudable are in substantial alignment.

22. An apparatus as recited in claim 2 wherein said means for distributing pressure further defines at least a portion of a channel.

23. An apparatus as recited in claim 2 wherein said means for distributing pressure comprises a tube having a flange attached thereto defining said first and second seating surfaces on opposite faces of said flange.

24. An apparatus as recited in claim 23 wherein the central axis of said tube and said extrudable are substantially aligned.

25. An apparatus as recited in claim 2 wherein said means for distributing pressure comprises a manifolded yoke-washer.

26. An apparatus as recited in claim 2 wherein said means for distributing pressure comprises a disc-shaped slug having an aperture generally centrally disposed therein.

27. An apparatus as recited in claim 2 further comprising an elastomeric harness wherein said at least one block is potted to maintain alignment.

28. An apparatus as recited in claim 27 wherein said at least one block comprises three blocks generally evenly spaced in a generally cylindrical elastomeric harness.

29. An apparatus for regulating fluid flow comprising:
   an actuator comprised of one or more blocks of magnetostrictive, electrostrictive or piezoelectric ceramic material, said actuator having a first end and a second end;
   an elastomer having a wedge shape including a thicker portion and a thinner portion, and an extrudable portion for regulating fluid flow therepast, said elastomer disposed along said second end of said actuator;
   means for distributing pressure disposed between said actuator and said elastomer, said means for distributing pressure including first and second seating surfaces, said first seating surface disposed at said second end of said one or more blocks and said elastomer disposed along said second seating surface;
   means for applying a strain inducing field to said one or more blocks; and
   means for constraining said actuator and said elastomer such that application of said strain inducing field to said one or more blocks causes displacement of said actuator and compression of said elastomer, extruding said elastomer to vary the shape of said extrudable portion and regulate fluid flow therepast.

30. An apparatus as recited in claim 29 wherein said extrudable portion is at the edge of said elastomer, positioned in the thicker portion of said elastomer, and spaced from said means for constraining, such that fluid flow therepast passes between said extrudable portion and said means for constraining.

31. An apparatus as recited in claim 2 wherein:
said means for constraining comprises a housing; and
said extrudable portion is at the edge of said elastomer, defining with said housing a non-circular opening for fluid flow therepast.

32. An apparatus as recited in claim 31 wherein said elastomer comprises a generally circular outer diameter, and said non-circular opening is defined by a chord of said generally circular outer diameter.

33. An apparatus as recited in claim 31 wherein said means for distributing pressure comprises an upper washer having a noncircular opening generally aligned with said extrudable.

34. An apparatus as recited in claim 31 wherein said housing further includes a lower washer disposed opposite said means for distributing pressure such that said elastomer is positioned therebetween, said lower washer shaped to permit fluid flow through said non-circular opening.

35. An apparatus as recited in claim 4 wherein said elastomer has four excised areas such that said elastomer has a cross shape with said extrudable portion disposed generally centrally in said cross shape and defining an orifice.

36. An apparatus as recited in claim 35 wherein at least one of said blocks is placed in each of said four excised areas.

37. An apparatus as recited in claim 4 wherein said means for constraining compresses both said at least one block and said elastomer such that said elastomer is initially extruded to interrupt fluid flow therepast.

38. An apparatus as recited in claim 37 wherein said means for applying said strain inducing field is applied to cause negative displacement of said blocks to vary the extrusion of said elastomer to vary the shape of said extrudable portion and regulate fluid flow therepast.

39. An apparatus as recited in claim 4 wherein said means for applying said infinitely variable strain inducing field is connected to cause positive displacement of said at least one block.

40. An apparatus as recited in claim 1 wherein said means for applying an infinitely variable strain inducing field further comprises means for controlling said means for applying an infinitely variable strain inducing field.

41. An apparatus as recited in claim 40 wherein said means for controlling comprises an oxygen concentration sensor.

42. An apparatus as recited in claim 40 wherein said means for controlling comprises:
   a gas concentration sensor providing sensor signals; and
   a microprocessor adapted to receive said sensor signals and send control signals to apply an infinitely variable strain inducing field in response to said sensor signals.

43. An apparatus as recited in claim 40 wherein said means for controlling comprises:
   a sensor providing sensor signals; and
   a microprocessor adapted to receive said sensor signals and send control signals to apply an infinitely variable strain inducing field in response to said sensor signals.

44. An apparatus as recited in claim 1 wherein:
said apparatus further comprises means for distributing pressure, said means for distributing pressure having a first end including said first and second seating surfaces, and a second end;
said means for constraining comprises:
   a housing having two or more openings, said housing further comprising a first bushing;

a second bushing disposed on said second end of said means for distributing pressure; and a spring compressibly disposed between said first bushing and said first seating surface;

said at least one block of magnetostrictive, electrostrictive or piezoelectric ceramic material disposed between said first bushing and said second bushing;

said first bushing, said spring, and said means for distributing pressure all disposed between said elastomer and said second end of said actuator, whereby said elastomer is disposed along said second seating surface; and said means for applying an infinitely variable strain inducing field applies said field to said at least one block such that application of said strain inducing field to said at least one block causes displacement thereof against said second bushing, and displacement of said means for distributing pressure against said spring, varying the extrusion of said elastomer in said opening to vary the shape of said extrudable portion and regulate fluid flow therepast.

45. An apparatus as recited in claim 44 wherein said first bushing is adjustably positionable in said housing.

46. An apparatus as recited in claim 44 wherein said second bushing is adjustably positionable on said means for distributing pressure.

47. An apparatus as recited in claim 44 wherein said means for distributing pressure further comprises a channel, said extrudable portion further defines an orifice in said elastomer, and the central axis of said channel and said orifice are generally aligned.

48. An apparatus as recited in claim 44 wherein said spring is compressibly disposed such that said elastomer is extruded to substantially interrupt fluid flow therepast.

49. An apparatus as recited in claim 48 wherein said means for applying said strain inducing field is connected such that application of said strain inducing field causes positive displacement of said blocks.

* * * * *

UNITED STATES PATENT AND TRADEMARK OFFICE
CERTIFICATE OF CORRECTION

PATENT NO. : 5,222,713
DATED : June 29, 1993
INVENTOR(S) : Lawless et al.

It is certified that error appears in the above-indentified patent and that said Letters Patent is hereby corrected as shown below:

Col. 15, Line 59, "said at lest" should be --said at least--.

Col. 16, Line 11, "$(SC_{1/3}Ta_{2/3})$" should be --$(Sc_{1/3}Ta_{2/3})$--.

Col. 16, Line 39, "said means of applying" should be --said means for applying--.

Col. 17, Line 9, "said extrudable" should be --said extrudable portion--.

Col. 17, Line 14, "claim 2" should be --claim 22--.

Col. 17, Line 19, "said extrudable" should be --said extrudable portion--.

Col. 18, Line 11, "said extrudable" should be --said extrudable portion--.

Signed and Sealed this

First Day of February, 1994

BRUCE LEHMAN

*Attest:*

*Attesting Officer*          *Commissioner of Patents and Trademarks*